US005453739A

United States Patent [19]

Kuramatsu

[11] Patent Number: 5,453,739

[45] Date of Patent: Sep. 26, 1995

[54] RADIO PAGING RECEIVER CAPABLE OF DISPLAYING MESSAGES AS DESIRED

[75] Inventor: Hiroyasu Kuramatsu, Tokyo, Japan

[73] Assignee: Nec Corporation, Japan

[21] Appl. No.: 4,187

[22] Filed: Jan. 13, 1993

Related U.S. Application Data

[63] Continuation of Ser. No. 651,759, Feb. 7, 1991, abandoned.

[30] Foreign Application Priority Data

Feb. 9, 1990 [JP] Japan ........................ 2-30443

[51] Int. Cl.[6] ........................ H04Q 1/00

[52] U.S. Cl. ........................ 340/825.44; 340/825.47

[58] Field of Search ........................ 340/825.44, 825.47, 340/825.27, 825.28

[56] References Cited

U.S. PATENT DOCUMENTS

| | | | |
|---|---|---|---|
| 4,369,443 | 1/1983 | Giallanza et al. | 340/825.47 |
| 4,786,901 | 11/1988 | Matai et al. | 340/825.27 |
| 4,870,403 | 9/1989 | Mori et al. | 340/825.47 |
| 4,873,519 | 10/1989 | Matai et al. | 340/825.27 |
| 4,942,616 | 7/1990 | Linstroth et al. | 340/825.27 |
| 4,975,693 | 12/1990 | Davis et al. | 340/825.47 |
| 5,045,848 | 9/1991 | Fascenda | 340/825.27 |

*Primary Examiner*—Donald J. Yusko
*Assistant Examiner*—Brian Zimmerman
*Attorney, Agent, or Firm*—Ostrolenk, Faber, Gerb & Soffen

[57] ABSTRACT

In a radio paging receiver having individual and common paging numbers and including a memory (20) which comprises a first part (20*a*) for memorizing individual messages, such as a directory number to be dialled by a user of the receiver, received by the use of the individual paging number and a second part (20*b*) for memorizing common messages, such as an exchange rate, received by the use of the common paging number, a first selecting section (41, 43) produces a first selection signal and a second selecting section (42, 43), a second selection signal. When supplied with the first selection signal, an accessing section (25, 26) reads the individual messages for supply to an LCD driver (22). The second selection signal is used in likewise accessing the second part. Accordingly, it is possible to read the individual and the common messages out of the first and the second memory parts as desired by using the first and the second selecting sections.

20 Claims, 6 Drawing Sheets

RADIO PAGING RECEIVER CAPABLE OF DISPLAYING MESSAGES AS DESIRED

This is a continuation of application Ser. No. 07/651,759, filed on Feb. 7, 1991 now abandoned.

BACKGROUND OF THE INVENTION

This invention relates to a radio paging receiver having an individual paging number and a common paging number.

A radio paging receiver of the type described comprises a receiving section for successively receiving a plurality of call signals and a plurality of message signals following the call signals, respectively, as received signals. The received signals are supplied to a decoder section to be decoded. More specifically, the decoder section is for judging whether or not each of the call signals is coincident with one of the individual paging number and the common paging number. When a specific one of the call signals is coincident with the individual call number, the decoder section receives the message signal following the specific call signal as an individual message signal. When a particular one of the call signals is coincident with the common number, the decoder section receives the message signal following the particular call signal as a common message signal.

The individual and the common message signals are supplied to a central processing unit (CPU) to be memorized as individual and common messages, respectively, in a memory section. More particularly, the memory section has first and second memory parts which are for memorizing the individual and the common message, respectively. The first and the second memory parts may memorize a plurality of individual messages and a plurality of common messages. An individual message may represent a telephone directory number of a subscriber whom a user is requested to call over the phone. A common message may represent an exchange rate.

In a conventional radio paging receiver, the CPU reads the individual and the common messages out of the first and the second memory parts, respectively, to supply a display unit with the individual and the common messages.

On displaying the common message on the display unit in the conventional radio paging receiver, it is necessary for the CPU to read all of the individual messages out of the first memory part. Namely, it is impossible to read the common message out of the second memory part until the CPU finishes reading all of the individual messages out of the first memory part.

In addition, it is impossible to read the individual message out of the first memory part until the CPU finishes reading all of the common messages out of the second memory part.

Accordingly, it is impossible to read the individual and the common messages out of the first and the second memory parts, respectively, as desired.

SUMMARY OF THE INVENTION

It is therefore an object of this invention to provide a radio paging receiver which is capable of reading individual and common messages as desired.

Other objects of this invention will become clear as the description proceeds.

On describing the gist of this invention, it is possible to understand that a radio paging receiver has an individual paging number and a common paging number and comprises: (1) a receiving section for receiving a call signal and a message signal following the call signal, (2) a judging section for judging whether or not the call signal is coincident with one of the individual and the common paging numbers, the judging section receiving the message signal as an individual message signal when the call signal is coincident with the individual paging number, the judging section receiving the message signal as a common message signal when the call signal is coincident with the common paging number, (3) a memory section having first and second memory parts for memorizing the individual and the common message signals as individual and common messages, respectively, (4) a reading section for reading the individual and the common messages out of the first and the second memory parts, respectively, and (5) a display section for displaying the individual and the common messages.

According to this invention, the reading section of the above-understood radio paging receiver comprises (A) first selecting means for selecting the first memory part to produce a first selection signal, (B) second selecting means for selecting the second memory part to produce a second selection signal, and (C) accessing means for accessing the first memory part to supply the first message to the display section in response to the first selection signal and for accessing the second memory part to supply the second message to the display section in response to the second selection signal.

DESCRIPTION OF THE PREFERRED EMBODIMENT

Figure 1:
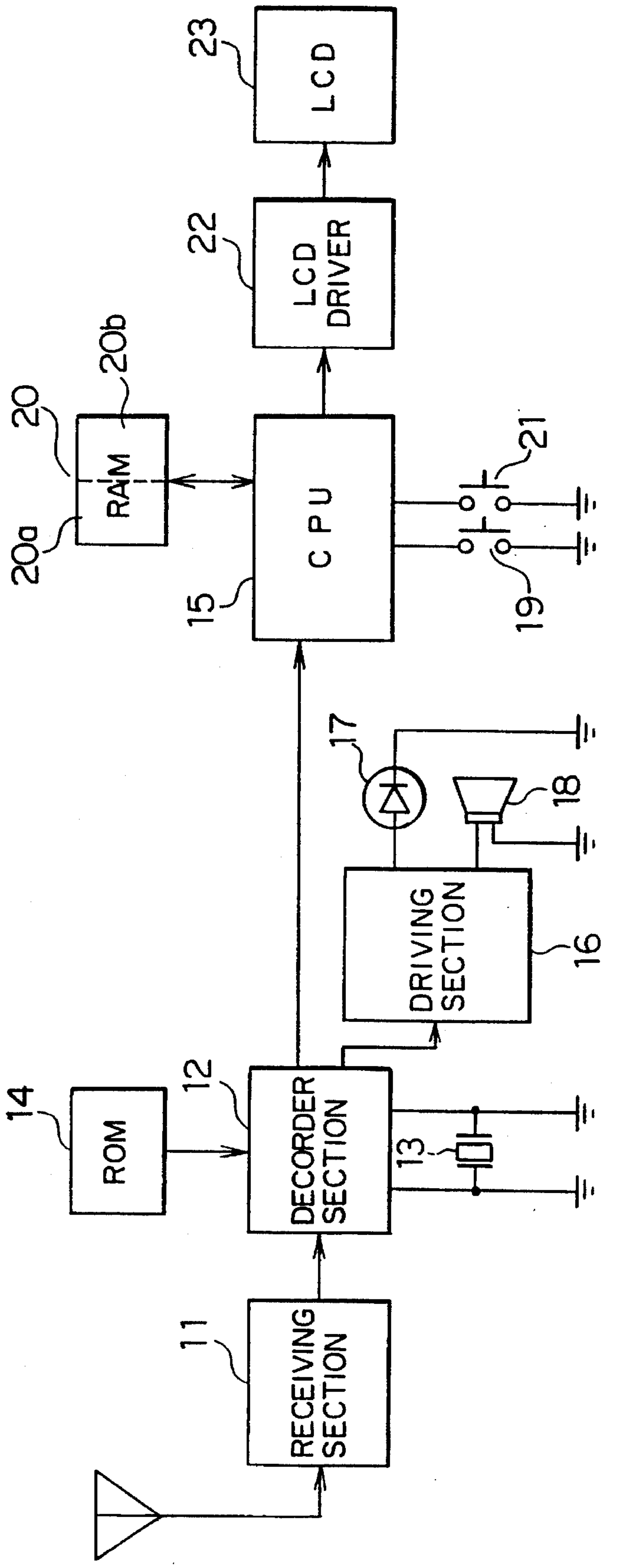
PRIOR ART FIG. 1
FIG. 1 is a block diagram of a conventional radio paging receiver.

Referring to FIG. 1, description will be made as regards a conventional radio paging receiver for a better understanding of this invention. The illustrated radio paging receiver comprises a receiving section 11 for receiving a radio signal which is transmitted from a transmitting station (not shown). The radio signal carries a plurality of call signals each of which is succeeded by a message signal indicative of a message. The receiving section 11 demodulates the radio signal into a demodulated signal representative of the call and the message signals to supply the demodulated signal to a decoder section 12.

The decoder section 12 is put into operation by a clock signal which is supplied from an oscillator 13. After establishment of synchronization, the decoder section 12 judges whether or not each of call signals is coincident with one of individual and common paging numbers which are memorized in a read only memory (ROM) 14.

When a specific one of the call signals is coincident with the individual paging number, the decoder section 12 receives the message signal following the specific call signal as a received individual message signal to supply the received individual message signal to a central processing unit (CPU) 15. When a particular one of the call signal is coincident with the common paging number, the decoder section 12 receives the message signal following the particular call signal as a received common message signal to supply the common message signal to the CPU 15. In addition, the decoder section 12 delivers a driving signal to a driving section 16 when the decoder section 12 receives one of the specific and the particular call signals. The driving section 16 is responsive to the driving signal and drives a light emitting diode (LED) 17 and a loudspeaker 18. When a stopping switch 19 is closed, the CPU 15 supplies the stopping signal to the decoder section 12. The decoder section 12 stops delivering the driving signal to the driving section 16 to put the LED 17 and the loudspeaker 18 out of operations.

The CPU 15 processes the individual and common message signals into a processed individual message signal and a processed common message signal, respectively, and memorizes the processed individual message signal and the processed common message signal in a random access memory (RAM) 20 as a memorized individual message and a memorized common message, respectively.

The RAM 20 has first and second memory parts 20*a* and 20*b* which memorize the memorized individual and the memorized common messages, respectively. The first and the second memory parts 20*a* and 20*b* may memorize a plurality of memorized individual messages and a plurality of memorized common messages.

Figure 2:
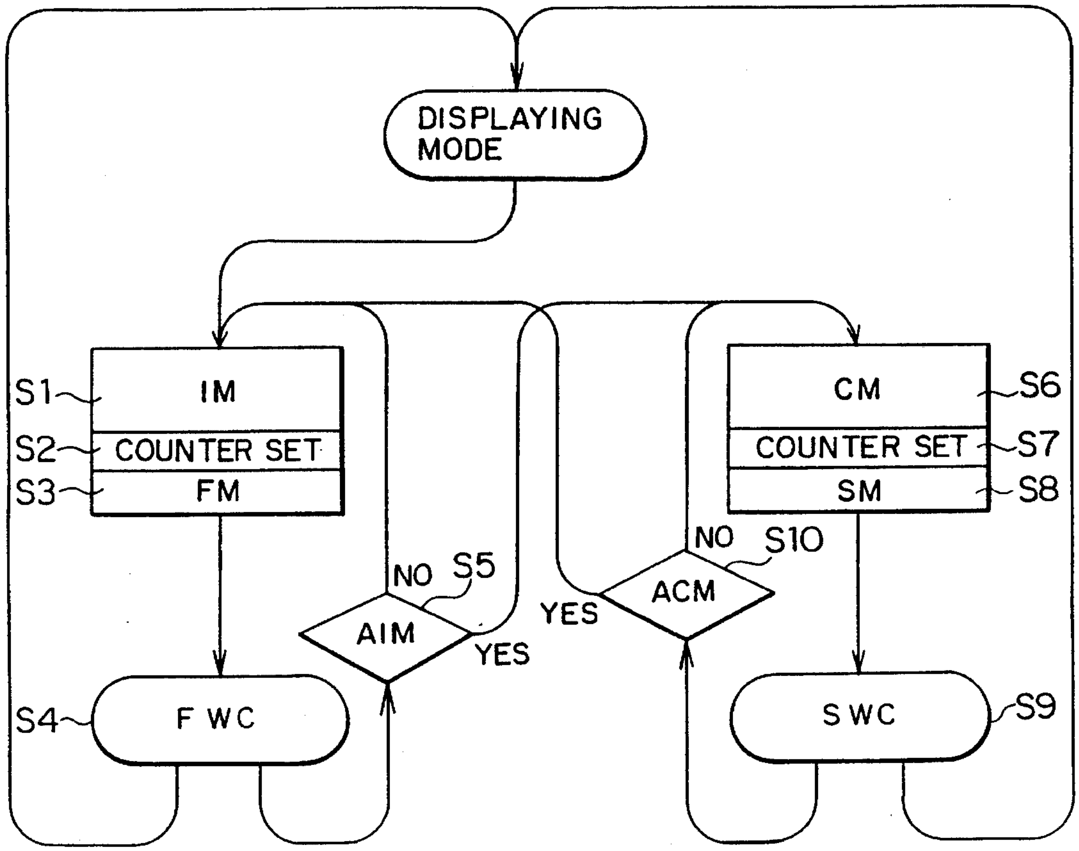
PRIOR ART FIG. 2
FIG. 2 is a flow chart for describing operation of a central processing unit used in the conventional radio paging receiver illustrated in FIG. 1.

Referring to FIG. 2 together with FIG. 1, the decoder section 12 further judges that the call signal is coincident with none of the individual and the common paging numbers. The CPU 15 is put into a displaying mode when the call signal is coincident with none of the individual and the common paging numbers, namely, when none of the individual and the common message signals is supplied to the CPU 15. An accessing switch 21 is for use in reading the memorized individual and the memorized common messages out of the first and the second memory parts. When the accessing switch 21 is closed in the displaying mode, the CPU 15 accesses the first memory part 20*a* to read one of the individual messages (IM) as a first message (FM) out of the first memory part 20*a* at a first step S1 labelled IM. The first step S1 proceeds to a second step S2 at which operation is carried out to set a predetermined time duration in a counter (not shown) which counts the predetermined time duration to produce a count-up signal. The CPU 15 supplies the first message to a liquid crystal display (LCD) driver 22 to display the first message on an LCD 23 at a third step S3 labelled FM.

After the third step S3, the CPU 15 is put into a first waiting condition (FWC) at a fourth step S4 labelled FWC. The CPU 15 returns back from the first waiting condition to the displaying mode when supplied with the count-up signal. When the accessing switch 21 is closed again during the first waiting condition, the CPU 15 judges whether or not all of the individual messages (AIM) are read out of the first memory part 20*a* at a fifth step S5 labelled AIM. When all of the individual messages are not read out of the first memory part 20*a*, the CPU 15 repeats the first through the fourth steps S1 to S5.

When all of the individual messages are read out of the first memory part 20*a*, the fifth step S5 proceeds to a sixth step S6 at which operation is carried out to read one of the common messages (CM) as a second message (SM) out of the second memory part 20*b* labelled CM. The sixth step S6 is followed by a seventh step S7 at which operation is carried out to set the predetermined time duration in the counter. The CPU 15 supplies the second message to the LCD driver 22 to display the second message on the LCD 23 at an eighth step S8 labelled SM.

After the eighth step S8, the CPU 15 becomes to a second waiting condition (SWC) at a ninth step S9 labelled SWC. The CPU 15 returns back from the second waiting condition to the displaying mode when supplied with the count-up signal. When the accessing switch 21 is operated during the second waiting condition, the CPU 15 judges whether or not all of the common messages ACM are read out of the second memory part 20*b* at a tenth step S10 labelled ACM. When all of the common messages are not read out of the second memory part 20*b*, the CPU 15 repeats the sixth through the eighth steps S6 to S8. When all of the common messages are read out of the second memory part 20*b*, the tenth step S10 returns to the first step S1.

As described above, the CPU 15 accesses the first memory part 20*a* at first to read the individual messages when the accessing switch 21 is closed during the displaying mode. Accordingly, it is impossible to read the common messages out of the second memory part 20*b* until all of the individual messages are read out of the first memory part 20*a*.

Figure 3:
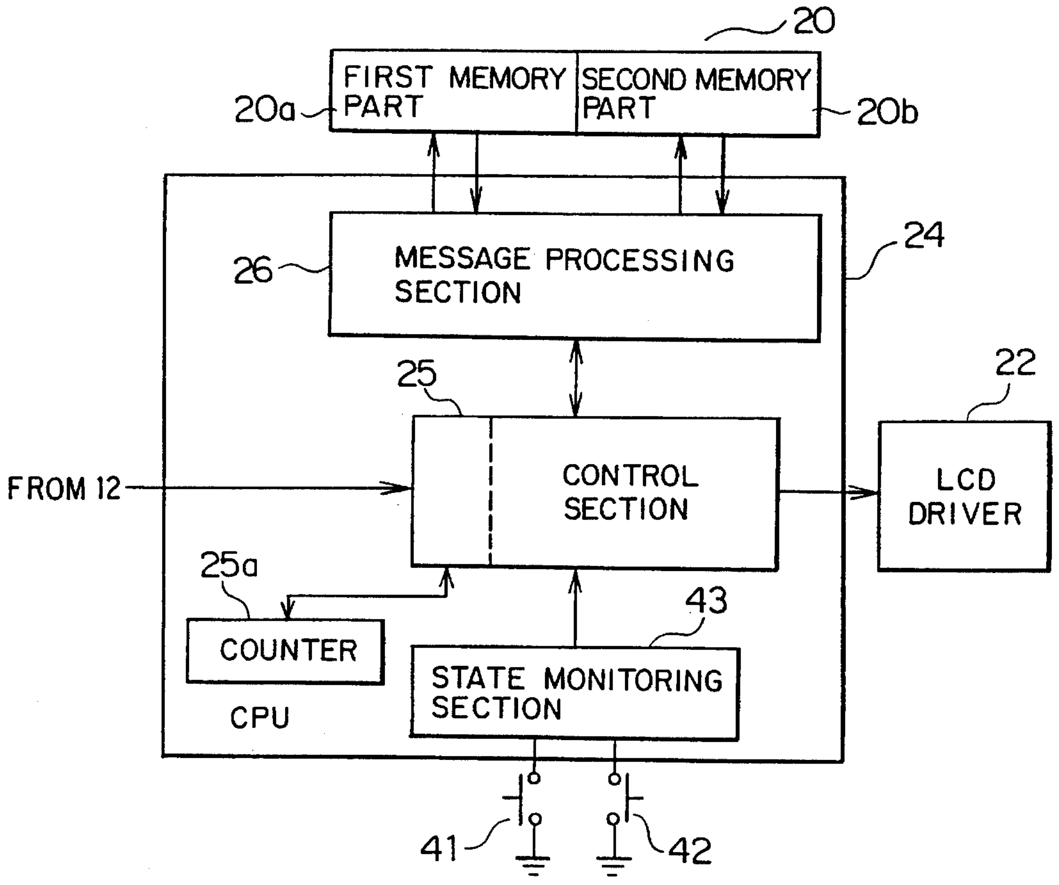
FIG. 3 is a block diagram of a central processing unit used in a radio paging receiver according to an embodiment of this invention.

Referring to FIG. 3, the description will proceed to a radio paging receiver according to an embodiment of this invention. In FIG. 3, the radio paging receiver comprises the RAM 20 and the LCD driver 22. The central processing unit (CPU) is somewhat different from that described in conjunction with FIG. 1 and is therefore designated afresh by a reference numeral 24. The remaining parts illustrated in FIG. 1 are omitted from FIG. 3 because the remaining parts are operable with likewise named signals.

As described above, the individual and the common message signals are supplied from the decoder section 12 to the CPU 24. The individual and the common message signals are received by a control section 25 of the CPU 24. The control section 25 delivers the individual and the common message signals to a message processing section 26 to process the individual and the common message signals into a processed individual message signal and a processed common message signal, respectively. The message processing section 26 stores the processed individual message signal and the processed common message signal as a memorized individual message and a memorized common message in the first memory part 20*a* and the second memory part 20*b*, respectively. The memorized individual message may represent a directory number to be dialled by a user of the receiver. The memorized common message may represent an exchange rate.

Figure 4:
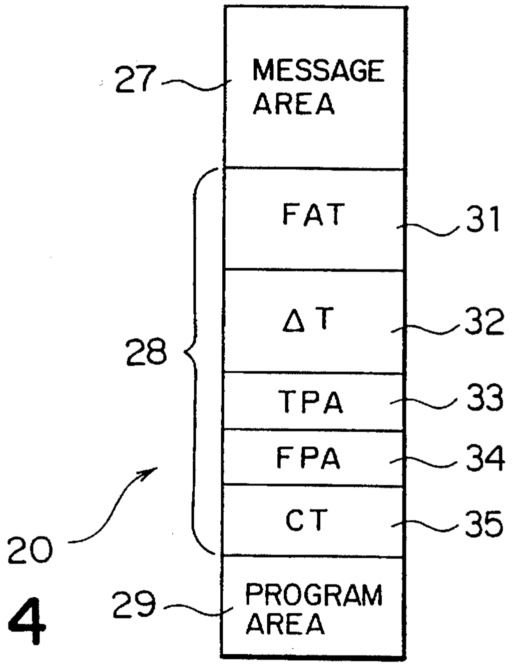
FIG. 4 is a diagram for use in describing operation of an RAM which is used in the central processing unit illustrated in FIG. 3.

Turning to FIG. 4, the description will be made as regards a detailed structure of the RAM 20. It will be presumed that the RAM 20 has a total memory capacity of a hundred and eighty-eight messages.

The RAM 20 has a message area 27, a list area 28 which is used in memorizing a list of the memorized individual and the memorized common messages, and a program area 29. The message area 27 has first through one hundred and eighty-eighth sectors each of which has a sector memory capacity of thirty-two bytes. The message is represented by at least one byte. When represented by more than thirty-two bytes, the message is memorized in a plurality of sectors.

The list area 28 has first through fifth partial areas 31 through 35. The first partial area 31 is for memorizing a file allocation table (FAT) and is labelled FAT. The file allocation table has first through one hundred and eighty-eighth divisions in one-to-one correspondence to the first through the one hundred and eighty-eighth sectors of the message area 27. The second partial area 32 is for memorizing a directory table (DT) and is labelled DT. The directory table has first through fortieth parts for memorizing directories in correspondence to first through fortieth ones of the memorized individual and the memorized common messages. Each directory indicates one of the first through the one hundred and eighty-eighth sectors that is used as a starting sector for a memorized individual or common message. The third partial are (TPA) 33 is for memorizing the number of the directories which are other than those used in connection with the first through the fortieth ones of the messages. The third partial area 33 is labelled TPA. The fourth partial area (FPA) 34 is for memorizing the number of the sectors which are other than those used in connection with the first through the fortieth ones of the messages. The fourth partial area is labelled FPA. The fifth partial area 35 is for memorizing a control table (CT) and is labelled CT. The control table has first and second control parts. The first control part is for memorizing the number of directories which are used for the memorized individual messages. The second part is for memorizing the number of directories which are used for the memorized common messages.

Turning back to FIG. 3, the CPU 24 is connected to first and second switches 41 and 42 in place of the accessing switch 21 (FIG. 1) and comprises a state monitoring section 43 for monitoring the states of the first and the second switches 41 and 42.

Figure 5:
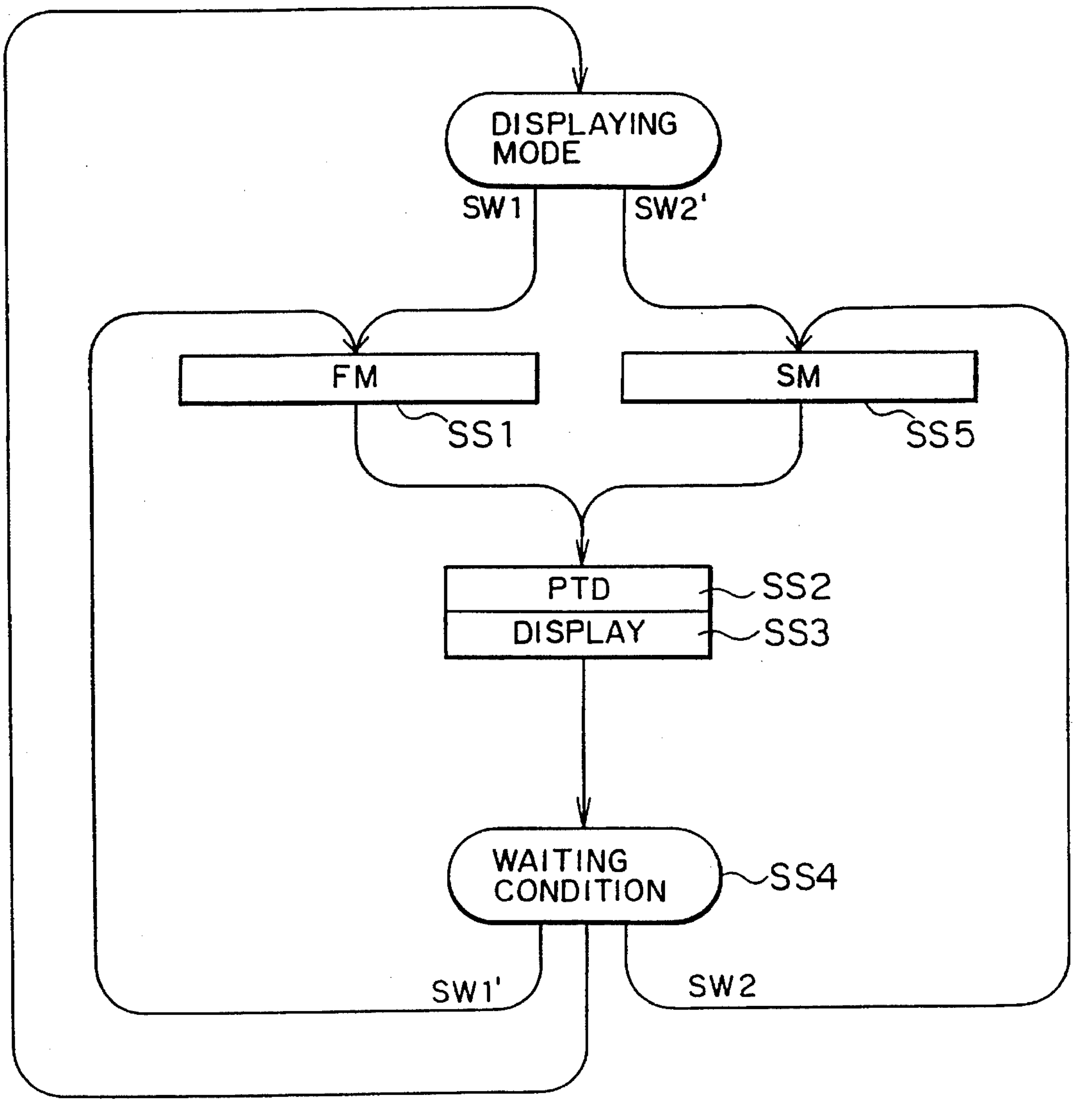
FIG. 5 is a flow chart for use in describing operation of the central processing unit illustrated in FIG. 3.

Referring to FIG. 5 together with FIG. 3, the CPU 24 is put into a displaying mode in which the individual and common messages are displayed, when the call signal is coincident with none of the individual and the common paging numbers. The displaying mode is so labelled in the figure. When the first switch 41 is closed to an on-state in the manner indicated by a label SW1 below indication of the displaying mode, the state monitoring section 43 monitors the on-state to produce a first selection signal and supplies the first selection signal to the control section 25. Supplied with the first selection signal, the control section 25 produces a first reading signal to supply the first reading signal to the message processing section 26.

When supplied with the first reading signal, the message processing section 26 accesses the message area 27 of the RAM 20 by referring to the contents of the list area 28 (FIG. 4) in the manner known in the art to read one of the memorized individual messages as a first message (FM) at a first step SS1 labelled FM. It is readily understood that the first message is read out of the message area 27 which is used as the first memory part **20*a* by referring to the contents of the list area 28 (FIG. 4**).

The first message is delivered from the message processing section 26 to the control section 25. When supplied with the first message, the control section 25 sets a predetermined time duration (PTD), for example, eight seconds, in a counter **25*a* which is connected to the control section 25 and which counts the predetermined time duration to produce a count-up signal at a second step SS2 labelled PTD. The control section 25 supplies the first message to the LCD driver 22 to display the first message on the LCD 23 (FIG. 1**) at a third step SS3.

After the third step SS3, the CPU 24 is put into a waiting condition or state involving waiting for a next operation at a fourth step SS4. When supplied with the count-up signal, the CPU 24 returns from the waiting condition back to the displaying mode. When the first switch 41 is closed again during the waiting condition in the manner indicated by a label SW1' below indication of the waiting condition, the CPU 24 repeats the first through the fourth steps SS1 to SS4 as described above.

When the second switch 42 is closed to an on-state during the waiting condition in the manner indicated by a label SW2 below indication of the displaying mode, the state monitoring section 43 monitors the on-state to produce a second selection signal and supplies the second selection signal to the control section 25. Supplied with the second selection signal, the control section 25 produces a second reading signal to supply the second reading signal to the message processing section 26.

When supplied with the second reading signal, the message processing section 26 accesses the message area 27 of the RAM 20 by referring to the contents of the list area 28 (FIG. 4) to read one of the memorized common messages as a second message (SM) at a fifth step SS5 labelled SM. It is readily understood that the second message is read out of the message area 27 which is used as the second memory part **20*b* by referring to the contents of the list area 28 (FIG. 4**).

When the second message is delivered from the message processing section 26 to the control section 25, the control section 25 repeats the second through the fourth steps SS2 to SS4 to display the second message on the LCD 23 (FIG. 1).

Similarly, the CPU 24 reads the first message out of the first memory part **20*a* of the RAM 20 to display the first message on the LCD 23 (FIG. 1) when the first switch 41 is closed during the waiting condition. In addition, the CPU 24 carries out the fifth step SS5 and the second through the fourth steps SS2 to SS4 when the second switch 42** is closed in the displaying mode in the manner indicated by a label SW2' below indication of the displaying mode.

Reviewing FIGS. 3 and 5, it is now understood that the first switch 41 and the state monitoring section 43 are operable as a first selecting section for selecting the first memory part **20*a* to produce the first selection signal. The second switch 42 and the state monitoring section 43 are operable as a second selecting section for selecting the second memory part to produce the second selection signal. The control section 25 and the message processing section 26 serves as an accessing section for accessing the first and the second memory parts in response to the first and the second selection signals, respectively. Alternatively, it is possible to understand that the monitoring section 43 is operable as the first and the second selecting sections. Connected to the first selecting section of the monitoring section 43, the first switch 41 puts the first selecting section into operation. Connected to the second selecting section of the monitoring section 43, the second switch 42** puts the second selecting section into operation.

Figure 6:
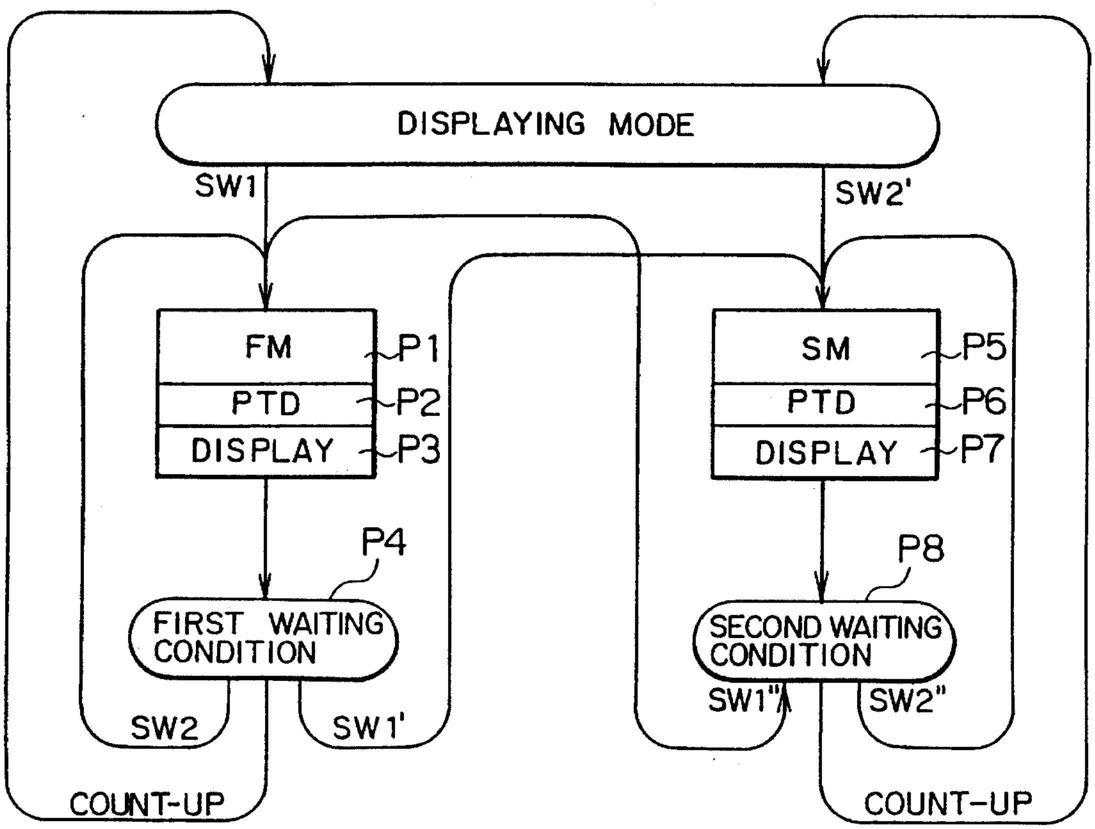
FIG. 6 is another flow chart for use in describing operation of the central processing unit illustrated in FIG. 3.

Referring to FIG. 6 together with FIG. 3, description will be made as regards another operation of the CPU 24. When the first switch 41 is closed in the displaying mode in the manner indicated by a label SW1 below indication of the displaying mode, the CPU 24 carries out the first through the third steps P1 to P3 which are similar to the first through the third steps SS1 to SS3 described in conjunction with FIG. 5. The CPU 24 delivers the first message to the LCD driver 22 to display the first message on the LCD 23 (FIG. 1). After the third step P3, the CPU 24 is put into a first waiting condition or state awaiting the next operation at a fourth step P4.

When the first switch 41 is closed again during the first waiting condition in the manner indicated by a label SW1' below indication of the first waiting condition, the CPU 24 carries out fifth through seventh steps P5 to P7 which are similar to the fifth step SS5, the second step SS2, and the third step SS3 described in connection with FIG. 5, respectively. The CPU 24 delivers the second message to the LCD driver 22 to display the second message on the LCD 23 (FIG. 1). After the seventh step P7, the CPU 24 is put into a second waiting condition or state awaiting the next operation at an eighth step P8.

When the second switch 42 is closed during the first waiting condition in the manner indicated by a label SW2, the CPU 24 repeats the first through the fourth steps P1 to P4.

The CPU 24 returns from the first waiting condition back to the displaying mode when supplied with the count-up signal labelled below the fourth step P4.

When the second switch 41 is closed in the displaying mode in the manner indicated by a label SW2', the CPU 24 carries out the fifth through the eight steps P5 to P8 to display the second message on the LCD 23 (FIG. 1).

When the second switch 42 is closed again during the second waiting condition in the manner indicated by a label SW2" below the eighth step P8, the CPU 24 repeats the fifth through the eighth steps P5 to P8.

When the first switch 42 is closed during the second waiting condition in the manner indicated by a label SW1" below the eighth step P8, the CPU 24 carries out first through the fourth steps P1 to P4.

Reviewing FIGS. 3 and 6, it is readily understood that the state monitoring section 43 produces the second selection signal when the first switch 41 is closed during the first waiting condition. The state monitoring section 43 produces the first selection signal when the second switch 42 is closed during the first waiting condition. Similarly, the state monitoring section 43 produces the second selection signal when the second switch 42 is closed during the second waiting condition. The state monitoring section 43 produces the first selection signal when the first switch 41 is closed during the second waiting condition.

Figure 7:
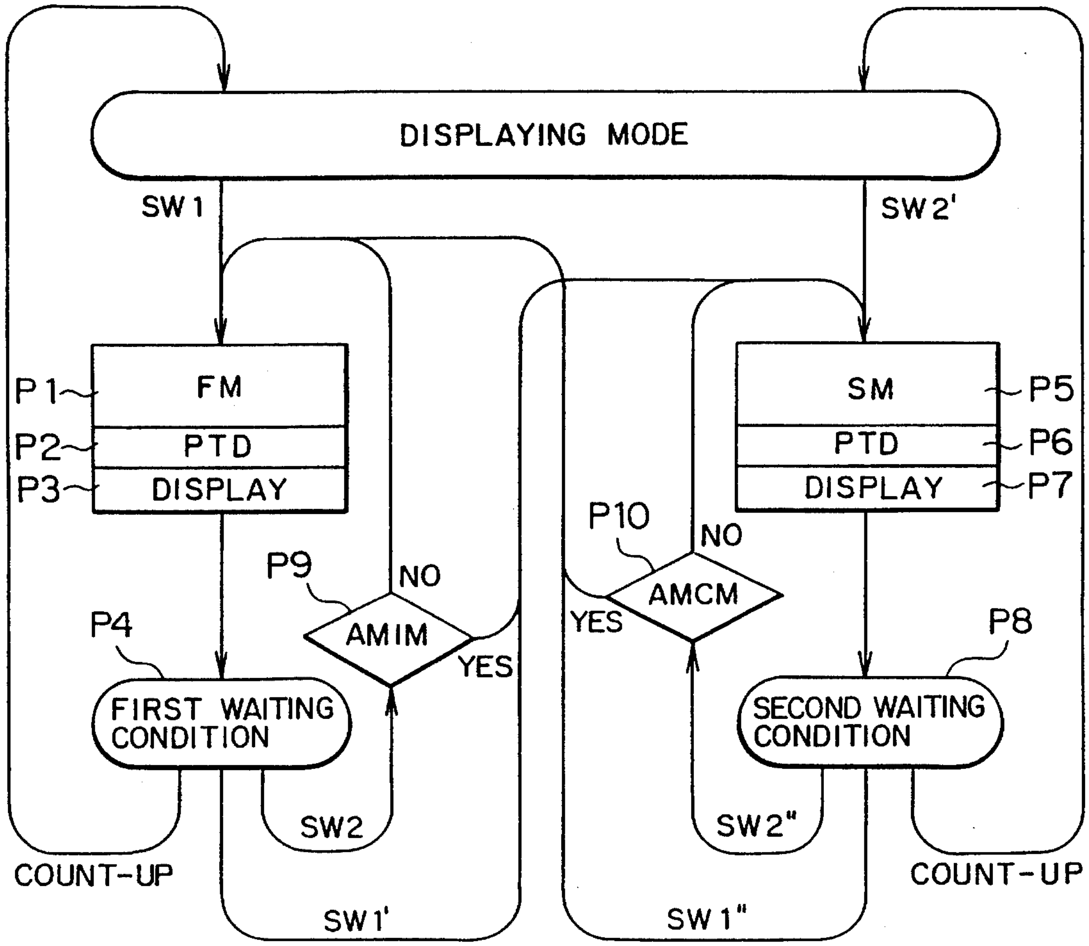
FIG. 7 is still another flow chart for use in describing operation of the central processing unit illustrated in FIG. 3.

According to FIGS. 3 and 7, the judging section (12) further judges that the call signal is coincident with none of the individual and the common paging numbers. The accessing section (25, 26) is put into a displaying mode when the call signal is coincident with none of the individual and the common paging numbers. The accessing section is put into the first waiting condition (P4) after accessing the first memory part. The accessing section is put into the second waiting condition (P8) after accessing the second memory part. The state monitoring section 43 alone serves as the first and the second selecting sections. The first and the second switches (41, 42) are connected to the first and the second selecting section (43). The first switch puts the first selecting section into operation in the displaying mode. The first switch puts the second and the first selecting sections into operation during the first and the second waiting conditions, respectively. The second switch puts the second selecting section into operation in the displaying mode. The second switch puts the first and the second selecting sections into operation during the first and the second conditions, respectively. The accessing section is connected to the counter section (**25*a***) and turns from each of the first and the second waiting conditions back to the displaying mode in response to the count-up signal.

Referring to FIG. 7 together with FIG. 3, description will be made as regards still another operation of the CPU 24. In FIG. 7, the CPU 24 carries out the first step P1 through the eighth step P8 generally in the manner illustrated with reference to FIGS. 6 and 3 and further carries out ninth and tenth steps P9 and P10 as will be described hereinafter. When the second switch 42 is closed during the first waiting condition indicated as the fourth step P4, the CPU 24 carries out the ninth step P9 at which the message processing section 26 judges whether or not all of the memorized individual messages (AMIM) are read out of the first memory part **20*a*. The ninth step P9 is therefore labelled by AMIM. When all of the memorized individual messages are already read out of the first memory part 20*a*, the CPU 24 carries out the fifth through the seventh steps P5 to P7. When all of memorized individual messages are not read out of the first memory part 20*a*, the CPU 24 carries out the first through the fourth steps P1 to P4**.

When the second switch 42 is closed during the second waiting condition depicted by the eighth step P8, the CPU 24 carries out the tenth step P10 at which the message processing section 26 judges whether or not all of the memorized common messages (AMCM) are read out of the second memory part **20*b*. The tenth step P10 is consequently labelled by AMCM. When all of the memorized common messages are already read out of the second memory part 20*b*, the CPU 24 carries out the first through the fourth steps P1 to P4. When all of memorized common messages are not read out of the second memory part 20*b*, the CPU 24 carries out the fifth through the seventh steps P5 to P7**.

What is claimed is:

1. A radio paging receiver having an individual paging number and a common paging number, comprising:

- a receiving section for receiving a call signal and a message signal following said call signal;
- a judging section for judging whether or not said call signal is coincident with said individual paging number or with said common paging number, said judging section receiving said message signal as an individual message signal when said call signal is coincident with said individual paging number, said judging section receiving said message signal as a common message signal when said call signal is coincident with said common paging number;
- a memory section having first and second memory parts for respectively memorizing said individual and said common message signals as individual and common messages;
- a display section for displaying said individual and said common messages; and
- means for selectively outputting to the display section a message from the first memory part or the second memory part, said means including:
  - (i) first selecting means for selecting said first memory part to produce a first selection signal;
  - (ii) second selecting means, independent from said first selecting means, for selecting said second memory part to produce a second selection signal; and
  - (iii) accessing means for accessing said first memory part to supply said individual message to said display section in response to said first selection signal when said display section displays either one of said individual and said common messages, said accessing means being effective for accessing said second memory part to supply said common message to said display section in response to said second selection signal when said display section displays either one of said individual and said common messages.

2. A radio paging receiver as claimed in claim 1, further comprising:

first and second switches connected to said first and said second selecting means for putting said first and said second selecting means into operation, respectively.

3. A radio paging receiver as claimed in claim 2, wherein:

said judging section further judges that said call signal is coincident with none of said individual and said common paging numbers;

said accessing means being put into a displaying mode involving displaying said individual and said common messages, when said call signal is coincident with none of said individual and said common paging numbers.

4. A radio paging receiver as claimed in claim 2, wherein:

said accesing means is put into a waiting state involving waiting for a next operation, after accessing each of said first and said second memory parts.

5. A radio paging receiver as claimed in claim 4, further comprising:

counter means for counting a predetermined time duration to produce a count-up signal;

said accessing means being connected to said counter means to be turned from said waiting condition back to said displaying mode in response to said count-up signal.

6. A radio paging receiver as claimed in claim 1, wherein:

said judging section further judges that said call signal is coincident with none of said individual and said common paging numbers;

said accessing means being put into a displaying mode involving displaying said individual and said common messages, when said call signal is coincident with none of said individual and said common paging numbers.

7. A radio paging receiver as claimed in claim 6, wherein:

said accessing means is put into a first waiting state involving waiting for a next operation, after accessing said first memory part, said accessing means being put into a second waiting state after accessing said second memory part.

8. A radio paging receiver as claimed in claim 7, further comprising:

a first switch connected to said first and said second selecting means for putting said first selecting means into operation in said displaying mode, said first switch putting said second selecting means into operation during said first waiting condition, said first switch putting said first selecting means into operation during said second waiting condition; and a second switch connected to said first and said second selecting means for putting said second selecting means into operation in said displaying mode, said second switch putting said first selecting means into operation during said first waiting condition, said second switch putting said second selecting means into operation during said second waiting condition.

9. A radio paging receiver as claimed in claim 6, further comprising:

counter means for counting a predetermined time duration to produce a count-up signal;

said accessing means being connected to said counter means and turning from each of said first and said second waiting conditions back to said displaying mode in response to said count-up signal.

10. A radio paging receiver as claimed in claim 1, further comprising monitoring means for monitoring said first and second selecting means to produce said first and second selection signals respectively.

11. A radio paging receiver having first and second paging numbers, comprising:

receiving means for receiving a call signal and a message signal following said call signal;

judging means for judging whether or not the received call signal is coincident with one of said first and said second paging numbers, said judging means being effective for receiving said message signal as a first message signal when said call signal is coincident with said first paging number, said judging means being effective for receiving said message signal as a second message signal when said call signal is coincident with said second paging number;

first memory means for exclusively memorizing said first message signal;

second memory means, independent from said first switching means, for exclusively memorizing said second message signal;

first switching means for selecting said first memory means to produce a first selection signal;

second switching means for selecting said second memory means to produce a second selection signal;

reading means responsive to said first and said second selection signals for reading said first and said second message signals out of said first and said second memory means, respectively;

annunciating means for annunciating the contents of said first and said second message signals to said reading means; and said reading means reading said first message signal out of said first memory means in response to said first selection signal when said annunciating means annunciates the content of either one of said first and said second message signals, said reading means reading said second message signal out of said second memory means in response to said second selection signal when said annunciating means annunciates the contents of either one of said first and said second message signals.

12. A radio paging receiver as claimed in claim 11, further comprising monitoring means for monitoring said first and second switching means to produce said first and second selection signals respectively.

13. A radio paging receiver including detecting means for successively detecting a plurality of paging signals and displays means for displaying a message signal following each of said paging signals, said paging receiver comprising:

first memory means for storing said message signal as a first message signal when said detecting means detects that one of said paging signals is coincident with a first predetermined paging number;

second memory means for storing said message signal as a second predetermined message signal when said detecting means detects that one of said paging signals is coincident with a second paging number; and means for selectively outputting to the display means a message from the first memory means or the second memory, said means including:

(i) first generating means for generating a first output signal;

(ii) second generating means, independent from said first generating means, for generating a second output signal; and (iii) accessing means for accessing to said second memory means to output said second message signal in response to said second output signal when said display means displays said first message signal, said accessing means accessing to said first memory means to sequentially output remaining ones of said first message signals in response to said first output signal when said display means displays one of said first message signals.

14. A radio paging receiver as claimed in claim 13, further comprising monitoring means for monitoring said first and second generating means to produce said first and second output signals respectively.

15. A radio paging receiver including detecting means for successively detecting a plurality of paging signals and display means for displaying a message signal following each of said paging signals, said radio paging receiver comprising:

first memory means for storing said message signal as a first message signal when one of said paging signals is coincident with a first predetermined paging number;

second memory means for storing said message signal as a second message signal when one of said paging signals is coincident with a second predetermined paging number; and means for selectively outputting to the display means a message from the first memory means or the second memory means, said means including:

(i) first means for generating a first output signal;

(ii) second means, independent from said first means, for generating a second output signal; and (iii) accessing means for accessing said second memory means to output said second message signal in response to said first output signal when said display means displays one of said first message signals, said accessing means accessing said first memory means to sequentially output remaining ones of said first message signals in response to said second output signal when said display means displays one of said first message signals, said accessing means accessing said first memory means to output said first message signals in response to said first output signal when said display means displays said second message signal.

16. A radio paging receiver as claimed in claim 15, further comprising monitoring means for monitoring said first and second means to produce said first and second output signals respectively.

17. A radio paging receiver including detecting means for successively detecting a plurality of paging signals and display means for displaying a message signal following each of said paging signals, said radio paging receiver comprising:

decoding means for decoding said message signal following each of said paging signals into a first decoded signal when one of said paging signals is coincident with a first predetermined paging number, said decoding means decoding said message signal following one of said paging signals into a second decoded signal when one of said paging signals is coincident with a second predetermined paging number;

memory means coupled to said decoding means for storing said first decoded signals and said second decoded signal; and means for selectively outputting to the display means either said first decoded message or said second decoded message, said means including:

(i) first means for generating a first output signal;

(ii) second means, independent from said first means, for generating a second output signal; and (iii) accessing means for accessing to said memory means to output said second decoded signal in response to said second output signal when said display means displays one of said first decoded signals as a first message signal, said accessing means accessing to said memory means to sequentially output remaining ones of said first decoded signals in response to said first output signal when said display means displays one of said first decoded signals as said first message signal.

18. A radio paging receiver as claimed in claim 17, further comprising monitoring means for monitoring said first and second means to produce said first and second output signals respectively.

19. A radio paging receiver including detecting means for successively detecting a plurality of paging signals and display means for displaying a message signal following each of said paging signals, said radio paging receiver comprising:

decoding means for decoding said message signal following one of said paging signals into a first decoded signal when each of said paging signals is coincident with a first predetermined paging number, said decoding means decoding said message signal following one of said paging signals into a second decoded signal when one of said paging signals is coincident with a second predetermined paging number;

memory means coupled to said decoding means for storing said first decoded signals and said second decoded signal; and means for selectively outputting to the display means either said first decoded signal or said second decoded signal, said means including:

(i) first means for generating a first output signal;

(ii) second means, independent from said first means, for generating a second output signal;

(iii) accessing means for accessing to said memory means to output said second decoded signal in response to said first output signal when said display means displays one of said first decoded signals as a first message signal, said accessing means accessing to said memory means to sequentially output remaining ones of said first decoded signals in response to said second output signal when said display means displays one of said first decoded signals as said first message signal, said accessing means accessing said memory means to output said first decoded signals in response to said first output signal when said display means displays said second decoded signal as a second message signal.

20. A radio paging receiver as claimed in claim 19, further comprising monitoring means for monitoring said first and second means to produce said first and second output signals respectively.

* * * * *

UNITED STATES PATENT AND TRADEMARK OFFICE

CERTIFICATE OF CORRECTION

PATENT NO. : 5,453,739

DATED : Sep. 26, 1995

INVENTOR(S) : Hiroyasu Kuramatsu

It is certified that error appears in the above-indentified patent and that said Letters Patent is hereby corrected as shown below:

On the title page of the above-identified patent, at item [73], please change "Nec" to --NEC--.

Signed and Sealed this

Twentieth Day of February, 1996

Attest:

Bruce Lehman

BRUCE LEHMAN

Attesting Officer

*Commissioner of Patents and Trademarks*